US008601586B1

(12) United States Patent
Boutros et al.

(10) Patent No.: US 8,601,586 B1
(45) Date of Patent: Dec. 3, 2013

(54) METHOD AND SYSTEM FOR DETECTING WEB APPLICATION VULNERABILITIES

(75) Inventors: Jad Boutros, Mountain View, CA (US); Srinath Anantharaju, Mountain View, CA (US); Damien Miller, Mountain View, CA (US); Parisa Tabriz, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1020 days.

(21) Appl. No.: 12/114,196

(22) Filed: May 2, 2008

Related U.S. Application Data (60) Provisional application No. 61/038,996, filed on Mar. 24, 2008.

(51) Int. Cl.
*H04L 29/06* (2006.01)

(52) U.S. Cl.
USPC ............. 726/25; 726/22; 726/23; 726/24; 713/187; 713/188; 709/217; 709/219; 709/224

(58) Field of Classification Search
USPC ........ 726/22–25; 713/187–188; 709/217–229
See application file for complete search history.

(56) References Cited

U.S. PATENT DOCUMENTS

| 7,757,287 | B2 * | 7/2010 | Gassoway | 726/24 |
| 7,984,500 | B1 * | 7/2011 | Khanna et al. | 726/22 |
| 2002/0010855 | A1 * | 1/2002 | Reshef et al. | 713/164 |
| 2006/0021054 | A1 * | 1/2006 | Costa et al. | 726/25 |
| 2007/0074169 | A1 * | 3/2007 | Chess et al. | 717/126 |
| 2007/0234415 | A1 * | 10/2007 | Zaninotti | 726/12 |
| 2008/0120722 | A1 * | 5/2008 | Sima et al. | 726/25 |
| 2008/0276316 | A1 * | 11/2008 | Roelker et al. | 726/23 |
| 2008/0295178 | A1 * | 11/2008 | Beresniewicz | 726/25 |
| 2008/0320567 | A1 * | 12/2008 | Shulman et al. | 726/4 |
| 2009/0049547 | A1 * | 2/2009 | Fan | 726/22 |

OTHER PUBLICATIONS

Sound and Precise Analysis of Web Applications for Injection Vulnerabilities by Wassermann et al; Publisher: ACM; Year: 2007.*
A Lightweight Tool for Detecting Web Server Attacks by Almgren et al; Publisher: NDSS; Year: 2000.*

* cited by examiner

*Primary Examiner* — Madhuri Herzog
(74) *Attorney, Agent, or Firm* — Sterne, Kessler, Goldstein & Fox P.L.L.C.

(57) ABSTRACT

One embodiment provides a system that detects vulnerabilities in a web application. During operation, the system obtains a web request which is directed to the web application, wherein the web request specifies at least one request parameter. The system then determines whether the web request is a suspicious web request by determining if at least one request parameter matches a known attack. Next, the system determines whether the suspicious web request can cause a vulnerability of the web application to be exploited.

22 Claims, 4 Drawing Sheets

METHOD AND SYSTEM FOR DETECTING WEB APPLICATION VULNERABILITIES

RELATED APPLICATION

This application claims priority under 35 U.S.C. section 119(e) to U.S. Provisional Application Ser. No. 61/038,996, entitled "Method and System for Detecting Web Application Vulnerabilities," by inventors Jad Boutros, Srinath Anantharaju, Damien Miller and Parisa Tabriz, filed on 24 Mar. 2008, the contents of which are herein incorporated by reference.

BACKGROUND

1. Field

The present embodiments generally relate to techniques for providing security for web applications. More specifically, the present embodiments relate to a method and a system that detects security vulnerabilities in a web application by performing web request analysis and replay verification.

2. Related Art

People are increasingly relying on the Internet to manage many aspects of their daily lives. Internet users routinely view content from numerous web sites and portals to obtain various types of information and entertainment. Internet users also increasingly rely on web applications or "web apps" to carry out more complicated online activities, which can include: web search, web mail, web gaming, online banking, online shopping, online auctions, discussion boards, Webblog, and many other activities.

Meanwhile, the proliferation of web applications has also made them popular targets for attacks by malicious users. One common type of attack is referred to as "cross-site scripting" (XSS). The concept of XSS is to exploit a vulnerability in a web application which allows content not controlled by the application (i.e., controlled by a malicious user) to be returned to a user (the victim) in such a way that it is possible to execute malicious code. This type of vulnerability has been exploited to generate powerful phishing attacks and hijack user sessions by stealing their HTTP cookies. Other common web application attacks can include, but are not limited to: code injection, header injection/tampering, response splitting, cross-site request forgery (XSRF), and cross-site script inclusion (CSSI). Note that all of the above attacks can lead to XSS attacks.

The increasing frequency of web-application attacks can be attributed to a number of factors. First, because most web applications are accessible to all web users, they are exposed to a large number of potential attackers. Web applications are also targeted because they provide opportunities to attack databases, web servers, and groups of users that are linked to the web applications. Moreover, even well-intended web applications frequently inadvertently introduce bugs which lead to XSS vulnerabilities that a malicious user can exploit. Unfortunately, as web applications become richer and more dynamic to meet the needs of Web 2.0 applications, these types of bugs are likely to proliferate.

Many proactive techniques exist to detect web-application vulnerabilities. These techniques include: manual code auditing; static analysis tools; software fuzzing tools, black-box testing tools, and language-specific intrusion-detection tools (such as a Personal Home Page-Intrusion Detection System (PHPIDS)). However, these existing techniques generally have some serious drawbacks. In particular, they generally do not test all the different permutations of a web request received by the web application, and hence cannot detect the full breadth of web-application vulnerabilities. Moreover, these existing techniques do not perform verification on the detection results, and therefore may detect a large number of "false vulnerabilities." This drawback can seriously impair the usefulness of the above-mentioned techniques in practice.

SUMMARY

One embodiment provides a system that detects vulnerabilities in a web application. During operation, the system obtains a web request which is directed to the web application, wherein the web request specifies at least one URL request parameter. The system then determines whether the web request is a suspicious web request by determining if at least one request parameter value matches a known attack. Next, the system determines whether the suspicious web request uncovers a vulnerability in the web application that can be exploited.

In a variation on this embodiment, if the web request is determined to be a suspicious web request, the system stores the web request in a database which stores suspicious web requests.

In a variation on this embodiment, the system determines whether the web request is a suspicious web request by using regular expressions to determine if at least one request parameter or value matches a known attack.

In a further variation on this embodiment, the system determines whether the suspicious web request uncovers a vulnerability in the web application that can be exploited by first receiving a set of predetermined attack strings, which are configured to test a range of vulnerabilities of the web application. Next, for each matched request parameter of the suspicious web request, the system replaces the request parameter value with each of the set of predetermined attack strings. The system then replays the suspicious web request using each of the set of predetermined attack strings. Next, the system determines whether the suspicious web request can cause a vulnerability of the web application to be exploited based on the application response.

In a further variation, the system replays the suspicious web request in a secure sandbox.

In a further variation, the system determines whether the suspicious web request can cause a vulnerability of the web application to be exploited by determining if (1) a script has been executed during the replay; or (2) a special character has been returned during the replay.

In a variation on this embodiment, the vulnerability can involve code injection; cross-site scripting; remote code inclusion; header response splitting; and other vulnerabilities.

In a further variation, a request parameter is determined to match a known attack if the request parameter comprises at least one special character.

In a further variation, the at least one special character can include a double quote, a single quote, an angle bracket, "\n," "\r," "\0," invalid characters, and other special characters.

DETAILED DESCRIPTION

The following description is presented to enable any person skilled in the art to make and use the described techniques, and is provided in the context of a particular application and its requirements. Various modifications to the disclosed embodiments will be readily apparent to those skilled in the art, and the general principles defined herein may be applied to other embodiments and applications without departing from the spirit and scope of the techniques. Thus, the techniques are not limited to the embodiments shown, but are to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

The present embodiments provide a technique for detecting and verifying, in near real-time, security vulnerabilities associated with a web application that are being actively targeted and exploited by malicious users or programs. More specifically, a detection component captures potential vulnerabilities of the web application, and a verification component facilitates reducing false vulnerabilities in the detection results.

Web-Application Environment

Figure 1:
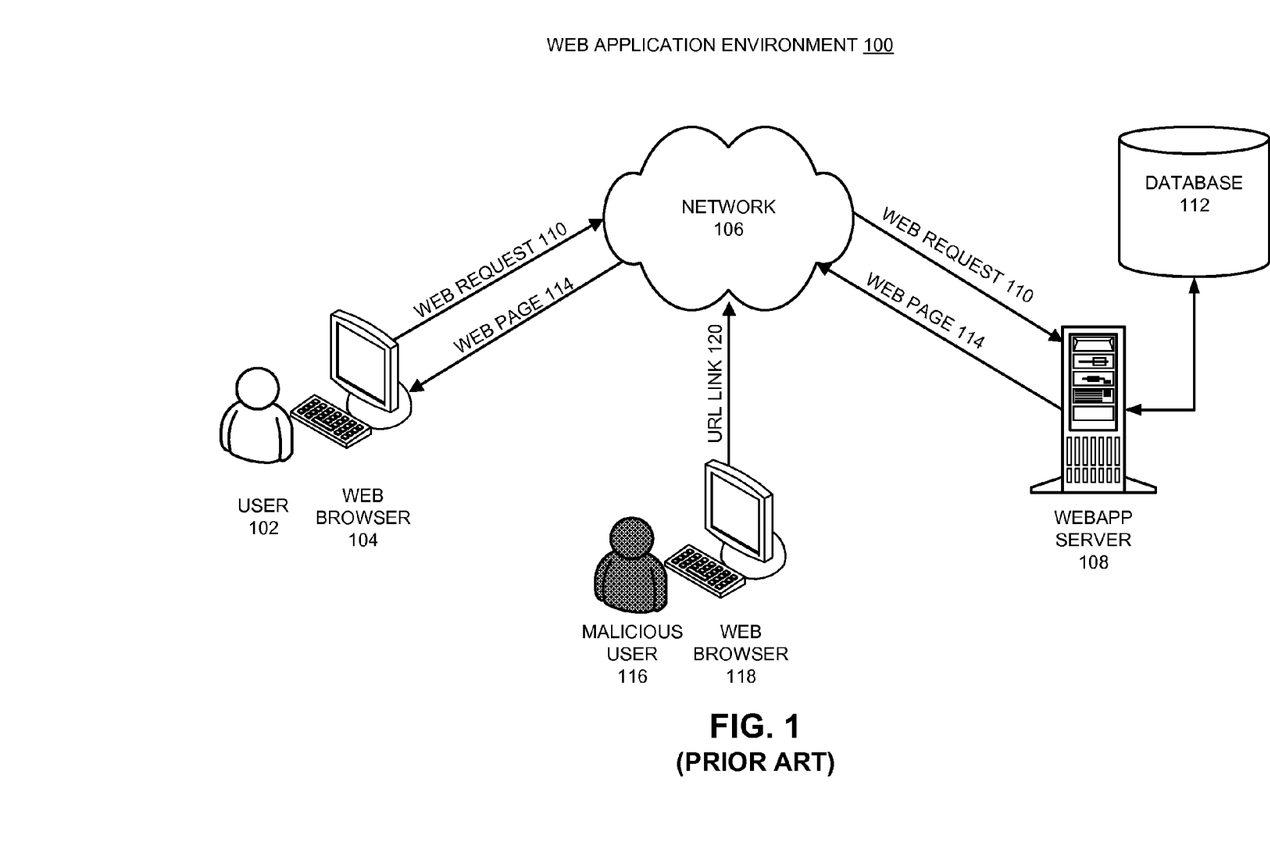
FIG. 1 illustrates a web application environment that enables online users to access a web application.

FIG. 1 illustrates a web application environment 100 that enables online users to access a web application. Web application environment 100 is associated with a user 102, a web browser 104, a network 106, and a webapp server 108. During operation, user 102 uses web browser 104 to access one or more web applications hosted by webapp server 108 via network 106.

Note that user 102 can include an individual user or a group of users. Web browser 104 can include any type of web browser, such as Internet Explorer™, Mozilla Firefox™, Safari™, Opera™, and other browsers that enable user 102 to view and interact with information on web pages located on the Internet or an intranet. Note that web browser 104 can be implemented on a desktop computer, a laptop computer, a PDA, a wireless phone, or other computing device that provides hardware for executing (and a user interface for displaying) web browser 104. Network 106 can include any type of wired or wireless communication channel capable of coupling together web browser 104 and webapp server 108. This includes, but is not limited to, a local area network, a wide area network, or a combination of networks. In one embodiment, network 106 includes the Internet. In some embodiments, network 106 includes phone and cellular phone networks.

During operation, user 102 sends a web request 110 through web browser 104 onto network 106. Note that web request 110 can be an HTTP request, an FTP request, or a web request based on any other communication protocol which may be used to render data through a browser.

Note that web request 110 typically includes a uniform resource locator (URL) field which identifies a web page or a web application located on webapp server 108. Additionally, web request 110 typically includes a request header, which may contain a Cookie field, a Host field, and other fields. An HTTP web request also includes an HTTP protocol field indicating the request method such as GET and POST. Note that web request 110 can also include other fields not mentioned above. Note that all these fields within web request 110 can be exploited by an attacker to mount a web-application attack. We collectively refer to each of these web request fields as a "request parameter."

Furthermore, some of these request fields may include sub-fields of their own. For example, a URL field may include the hostname, the URL path, as well as URL query parameters. We refer to each sub-field within a request field also as a "request parameter." Hence, in the discussion throughout, a "request parameter" is broadly defined and can include both an entire request field within the web request, and a parameter within a specific request field.

Web request 110 is transmitted over network 106 and received by webapp server 108. Next, webapp server 108 locates the requested web application software and an associated web page in a local directory, or from an external database 112, and sends out a web page 114 along with the dynamic content as a response back to user 102 via network 106. Note that webapp server 108 can create dynamic content by mixing data with templates, running programs, or by accessing a database 112.

Web application environment 100 also includes a malicious user 116 who is linked to user 102 through web browser 118 via network 106. Malicious user 116 can attack user 102 by exploiting a security vulnerability of webapp server 108 (for example, to steal personal information from user 102). For example, malicious user 116 can launch a cross-site scripting (XSS) attack on user 102 by embedding malicious code into web request 110, wherein the malicious code affects client-side scripts of a web application requested by user 102.

For example, malicious user 116 can send a URL link 120 directed to webapp server 108 via email or embedded in a web page to user 102. Embedded in URL link 120 is malicious script which is encoded in a string which represents a value for a variable, wherein the string is encoded in the link. Unsuspecting user 102 clicks on the URL link which generates an HTTP:URL request with the malicious script. The HTTP:URL request is then sent to webapp server 108, which does not filter the HTTP:URL request. Instead, webapp server 108 returns the requested web page including the malicious script back to user 102. Next, user 102's web browser 104 executes the web page and the malicious script within a secure environment belonging to user 102, which is a significant breach of security.

Note that the above-described scenario and web application environment 100 are used to illustrate the general concept of an attack on a web-application. However, the described techniques are not limited to the specific web application environment 100 illustrated in FIG. 1, and are applicable to any web application environment that involves users sending web requests to a web application through a network and receiving corresponding web page responses.

System for Webapp Vulnerability Detection

Figure 2:
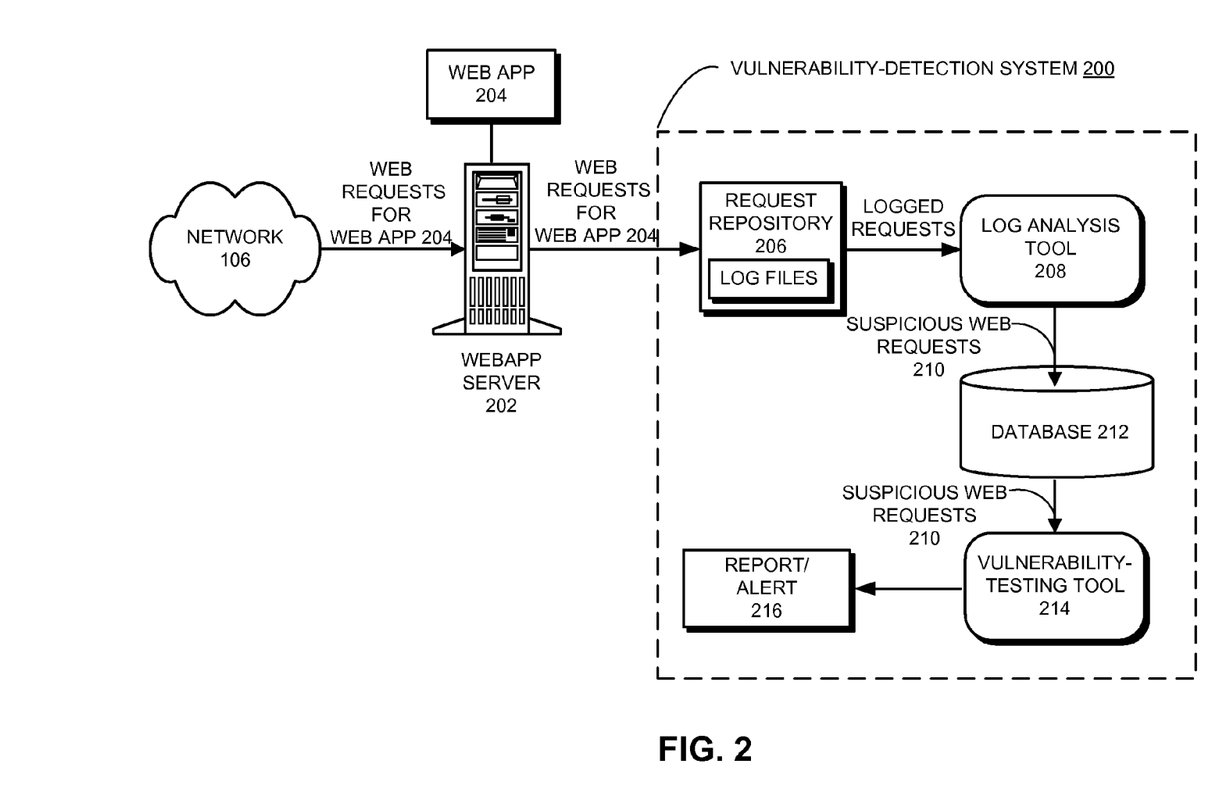
FIG. 2 illustrates a vulnerability-detection system for detecting vulnerabilities in a web application in accordance with an embodiment.

FIG. 2 illustrates a vulnerability-detection system 200 for detecting vulnerabilities in a web application in accordance with an embodiment.

As illustrated in FIG. 2, webapp server 202 receives all incoming web requests directed to a web application 204. Webapp server 202 is coupled to vulnerability-detection system 200. Although vulnerability-detection system 200 is shown as being external to webapp server 202, vulnerability-detection system 200 can also be implemented locally within webapp server 202.

As shown in FIG. 2, the web requests which are directed to web application 204 and received by webapp server 202 are logged into a request repository 206 associated with vulnerability-detection system 200. Note that some of the logged web requests may be "bad" requests designed to exploit potential vulnerabilities of web application 204. In some embodiments, request repository 206 uses one or more log files to log the web requests.

The logged requests in the request repository 206 are then fed into a log analysis tool 208, which processes each of the logged web requests to determine whether the web request is a suspicious web request. In some embodiments, log analysis tool 208 determines whether a web request is a suspicious web request based on whether that web request resembles a known attack which targets a vulnerability of web application 204.

More specifically, log analysis tool 208 examines each of the request parameters included in a given web request against a list of known attacks. For example, the following pseudo-web request:
HTTP://www.mywebapp.com/cgi?q=String(1)&name=String(2)&title=String(3) comprises three parameters: "q," "name," and "title," wherein each parameter is followed by a string value. Each parameter and the associated string form a parameter field. In some embodiments, log analysis tool 208 can parse the web request into one or more request fields (such as header field, URL field, HTTP protocol field, etc) and further parse each request field into individual parameter fields. The log analysis tool 208 subsequently examines each parameter field against the list of known attacks.

In one embodiment, log analysis tool 208 can use a regular expression (or "regex") to determine if a request matches a known attack. Note that the process of using regular expressions is well known in the art, and hence is not discussed in detail herein. Note that log analysis tool 208 can use other pattern-matching techniques to identify web requests that match a known attack.

In some embodiments, a request is considered to match a known attack if a request parameter comprises at least one special character, which can include, but is not limited to: a double quote, a single quote, an angle bracket, "\n," "\r," "\0," invalid characters, and other special characters.

In one embodiment, log analysis tool 208 determines that a web request is a suspicious web request if at least one request parameter of the web request matches a known attack. In some embodiments, log analysis tool 208 iterates through all logged web requests, and generates an initial list of suspicious web requests based on the matches with known attacks.

In some embodiments, log analysis tool 208 also includes a set of filters which can be applied to the initial list of suspicious web requests. These filters can include a "whitelist" filter, which removes web requests that have been previously identified (i.e., "whitelisted") as safe requests from the initial list. Another filter identifies those requests that cause a "404" or "URL Not Found" error response, and subsequently removes them from the initial list of suspicious web requests.

A duplicate-identification filter may be used by log analysis tool 208 to identify duplicate web requests in the initial list of suspicious web requests. For example, identical web requests may be received from different attackers, and such duplicate requests may be removed from the list. In some embodiments, requests that are not identical may be treated as duplicate requests based on some rules. For example, one rule used by the duplicate-identification filter treats requests that have the same set of request parameters (referred as an "attack skeleton") but different attack strings as duplicate requests. In this case, the duplicate web requests can be represented by a single web request having a unique attack skeleton. For example, the following two pseudo-HTTP:URL requests are treated as duplicates:
(1)HTTP://www.mywebapp.com/
index.html?q=<script>alert(1)</script> and
(2)HTTP://www.mywebapp.com/
index.html?q=<script>alert(23)</script>, because they both have the same attack skeleton "www.mywebapp.com/index.html?q."

Note that by removing duplicate requests from the initial list of suspicious web requests, log analysis tool 208 generates a smaller set of suspicious web requests 210. Referring back to FIG. 2, log analysis tool 208 outputs suspicious web requests 210, which are subsequently stored into a database 212.

Suspicious web requests 210 can include a very high number of "false identifications." While logged requests that match a known attack are indicative of an actual attack, they are usually only exploitable under certain conditions, and these conditions are typically difficult to identify by simply examining the web request string. In some embodiments, it is desirable to identify those web requests that actually cause a vulnerability of the web application to be exploited. Consequently, vulnerability-detection system 200 further includes a vulnerability-testing tool 214 that operates on suspicious web requests 210.

Specifically, suspicious web requests 210 received at database 212 become inputs to vulnerability-testing tool 214, which processes each of the suspicious requests to determine whether the suspicious web request can cause a vulnerability of web application 204 on webapp server 202 to be exploited. In some embodiments, vulnerability-testing tool 214 continuously scans database 212 for newly recorded suspicious requests that have not been tested for vulnerability. In one embodiment, if vulnerability-testing tool 214 determines that a suspicious request 210 actually causes an exploitable vulnerability in web application 204 to be exploited, a report is generated and/or an alert 216 is sent out to a security administrator.

Figure 3:
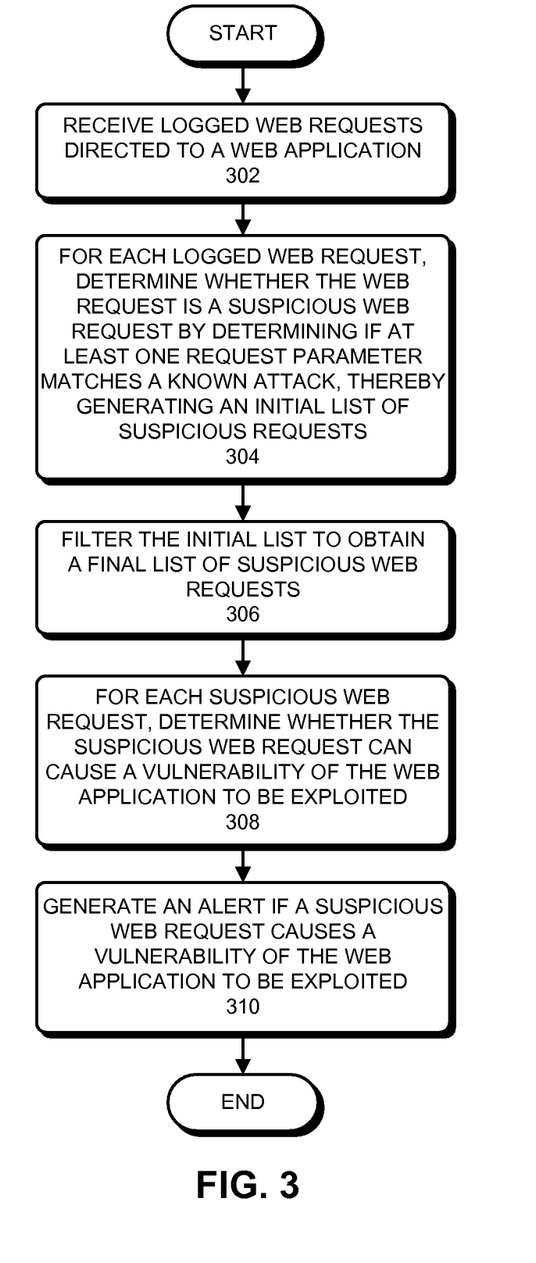
FIG. 3 presents a flowchart illustrating the process of detecting vulnerabilities in a web application in accordance with an embodiment.

FIG. 3 presents a flowchart illustrating the process of detecting vulnerabilities in a web application in accordance with an embodiment. This process summarizes the operation of vulnerability-detection system 200.

During operation, the system receives logged web requests which are directed to the web application, wherein each logged web request specifies at least one request parameter (step 302). Next, for each logged web request, the system determines whether the web request is a suspicious web request by determining if at least one request parameter matches a known attack (step 304). As mentioned above, the system can use a regular expression or other pattern-matching techniques to determine if a given request parameter potentially contains an attack. This step generates an initial list of suspicious requests.

The system then applies a set of filters to remove safe web requests, duplicate requests, and other requests based on a set of rules (step 306). This step generates a final list of suspicious requests. (In some embodiments, step 306 is optional.)

The system can then store the final list of suspicious web requests into a database for further processing.

Next, for each suspicious request in the final list, the system determines whether the suspicious web request can cause a vulnerability of the web application to be exploited (step 308). This step is described in more detail in conjunction with FIG. 4. If a suspicious web request is determined to cause a vulnerability of the web application to be exploited, the system subsequently generates a report and/or an alert is sent to a system administrator (step 310).

Figure 4:
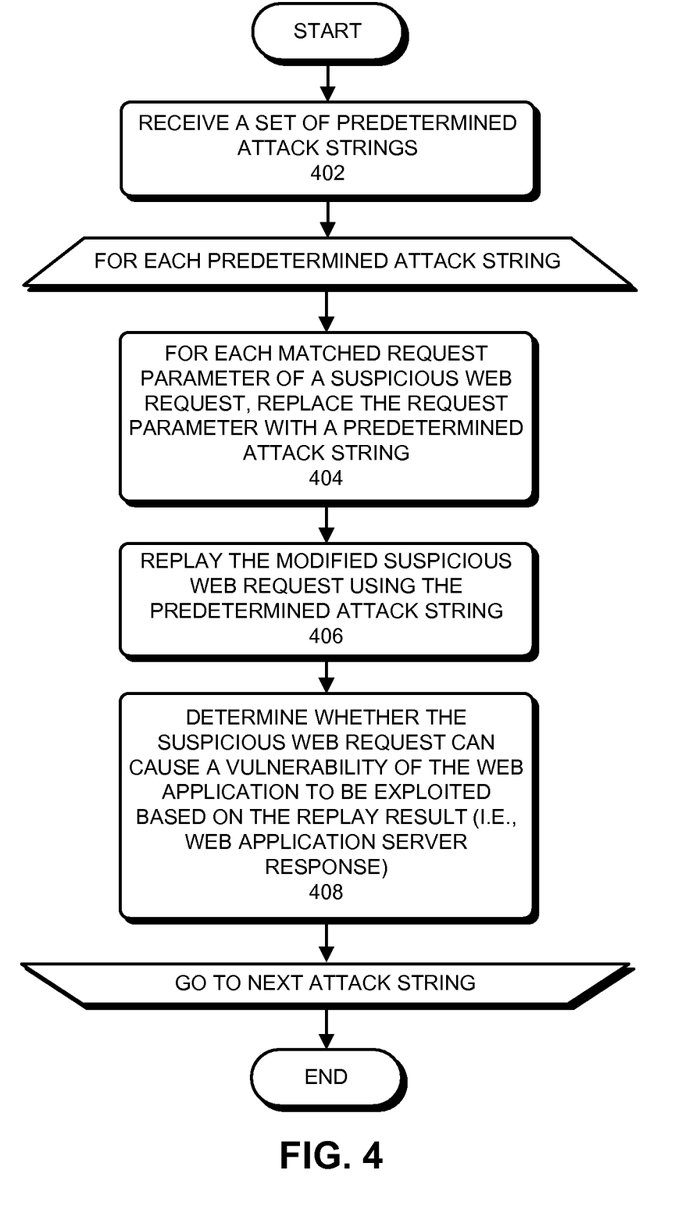
FIG. 4 presents a flowchart illustrating the process of determining whether a suspicious web request can cause a vulnerability of the web application to be exploited in accordance with an embodiment.

FIG. 4 presents a flowchart illustrating the process of determining whether a suspicious web request can cause a vulnerability of the web application to be exploited in accordance with an embodiment.

During operation, the system receives a set of predetermined attack strings, which are configured to test a range of vulnerabilities of the web application targeted by the suspicious web requests (step 402). In some embodiments, each attack string is characterized as including at least one known special character which has been linked to web application attacks. These special characters can include, but are not limited to: a double quote, a single quote, an angle bracket, "\n," "\r," "\0," invalid characters, and other special characters.

Next, for each matched request parameter of the suspicious web request, the system replaces the request parameter with a predetermined attack string (step 404). More specifically, replacing the request parameter involves replacing the part of the request sent by the user (i.e., the string/value of the parameter). For example, in the following pseudo-HTTP:URL requests, HTTP://www.mywebapp.com/index.html?q=<script>JScode</script>, wherein the "q" parameter field was found to have matched an attack signature (e.g., "<" and ">"), the value field of the q parameter "<script>JScode</script>" is replaced by the predetermined attack string. Hence, the above HTTP:URL requests becomes HTTP://www.mywebapp.com/index.html?q=AttackString (1); or HTTP://www.mywebapp.com/index.html?q=AttackString(2); . . . or HTTP://www.mywebapp.com/index.html?q=AttackString(n), etc.

The system then replays the modified suspicious web request using the predetermined attack string (step 406). In some embodiments, the system replays the suspicious web request in a secure sandbox, so that the web application is protected from actually being exploited.

The system next determines whether the suspicious web request can cause a vulnerability of the web application to be exploited based on the replay result, i.e., the response of the web application server (step 408). In some embodiments, the system specifically looks to see if a predetermined number is returned in a predetermined context, such as in JavaScript™ within a replay result. In another embodiment, the system determines whether the suspicious web request can cause a vulnerability to be exploited based on whether a specific type of script has been executed during the replay process.

The system then returns to step 404 and repeats steps 404 to 408 using the next predetermined attack string in the set of predetermined attack strings.

Referring back to FIG. 2, in some embodiments, vulnerability-testing tool 214 continuously scans for new suspicious web requests in database 212 at a predetermined time interval, e.g., every 3 hours. In some embodiments, this time interval can be dynamically varied based on the web request traffic. Note that vulnerability-testing tool 214 provides a continuously running verification mechanism for unverified records and can determine if web application 204 has been exploited in near real-time.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the present embodiments is defined by the appended claims.

What is claimed is:

1. A method for detecting vulnerabilities in a web application, comprising:
   obtaining a plurality of web requests directed to the web application, wherein each web request specifies a request field including a requested uniform request locator (URL) having a hostname and at least one parameter field, the at least one parameter field including a parameter and a parameter value corresponding to the parameter;
   determining, using a hardware computing device, an initial list of suspicious web requests of the plurality of web requests, by determining if the at least one parameter field in the requested URL of each of the plurality of web requests matches a known attack;
   generating a final list of suspicious web requests by filtering the initial list of suspicious web requests, the filtering including removing duplicate suspicious web requests;
   receiving a set of predetermined attack strings configured to test a range of vulnerabilities of the web application; and
   determining whether each of the suspicious web requests of the final list potentially exploits a vulnerability of the web application based on the set of predetermined attack strings, the determining including replaying each of the suspicious web requests of the final list using the predetermined attack strings and determining whether a script has been executed or a special character has been returned during the replay.

2. The method of claim 1, further comprising: storing the initial list of suspicious requests in a database that stores a set of suspicious web requests which have been verified as exploiting a vulnerability of the web application.

3. The method of claim 1, wherein determining an initial list of suspicious web requests of the plurality of web requests, comprises using a regular expression to determine if the at least one parameter field in each requested URL matches the known attack.

4. The method of claim 3, wherein determining whether each of the suspicious web requests of the final list potentially exploits a vulnerability of the web application comprises:
   for each parameter field that matches a known attack of the web request,
      replacing the parameter value of the respective parameter field with each of the set of predetermined attack strings;
      replaying each of the suspicious web requests of the final list using the respective replaced set of predetermined attack strings; and
      determining whether each of the suspicious web requests of the final list potentially exploits a vulnerability of the web application based on a result of the replaying.

5. The method of claim 4, wherein replaying each of the suspicious web requests of the final list comprises replaying each of the suspicious web requests of the final list in a secure sandbox.

6. The method of claim 1, wherein the vulnerability comprises at least one of:
  code injection;
  cross-site scripting;
  remote code inclusion;
  header response splitting; and
  other vulnerabilities.

7. The method of claim 1, wherein the at least one parameter field in the requested URL of each of the plurality of web requests is determined to match the known attack if the parameter value comprises at least one special character.

8. The method of claim 7, wherein the at least one special character comprises at least one of:
  a double quote;
  a single quote;
  an angle bracket;
  \n;
  \r;
  \0;
  invalid characters; and
  other special characters.

9. A non-transitory computer-readable storage medium storing instructions that when executed by a computer cause the computer to perform a method for detecting vulnerabilities in a web application, the method comprising:
  obtaining a plurality of web requests directed to the web application, wherein each web request specifies a request field including a requested uniform request locator (URL) having a hostname and at least one parameter field, the at least one parameter field including a parameter and a parameter value corresponding to the parameter;
  determining, using a hardware computing device, an initial list of suspicious web requests of the plurality of web requests, by determining if the at least one parameter field in the requested URL of each of the plurality of web requests matches a known attack;
  generating a final list of suspicious web requests by filtering the initial list of suspicious web requests, the filtering including removing duplicate suspicious web requests;
  receiving a set of predetermined attack strings configured to test a range of vulnerabilities of the web application; and
  determining whether each of the suspicious web requests of the final list potentially exploits a vulnerability of the web application based on the set of predetermined attack strings, the determining including replaying each of the suspicious web requests of the final list using the predetermined attack strings and determining whether a script has been executed or a special character has been returned during the replay.

10. The non-transitory computer-readable storage medium of claim 9, wherein the method further comprises storing the initial list of suspicious web requests in a database that stores a set of suspicious web requests which have been verified as exploiting a vulnerability of the web application.

11. The non-transitory computer-readable storage medium of claim 9, wherein determining an initial list of suspicious web requests of the plurality of web requests comprises using a regular expression to determine if the at least one parameter field in each requested URL matches the known attack.

12. The non-transitory computer-readable storage medium of claim 11, wherein determining whether each of the suspicious web requests of the final list potentially exploits a vulnerability of the web application comprises:
  for each parameter field that matches a known attack of the web request,
    replacing the parameter value of the respective parameter field with each of the set of predetermined attack strings;
  replaying each of the suspicious web requests of the final list using the respective replaced set of predetermined attack strings; and
  determining whether each of the suspicious web requests of the final list potentially exploits a vulnerability of the web application based on a result of the replaying.

13. The non-transitory computer-readable storage medium of claim 12, wherein replaying each of the suspicious web requests of the final list comprises replaying each of the suspicious web requests of the final list in a secure sandbox.

14. The non-transitory computer-readable storage medium of claim 9, wherein the vulnerability comprises at least one of
  code injection;
  cross-site scripting;
  remote code inclusion;
  header response splitting; and
  other vulnerabilities.

15. The non-transitory computer-readable storage medium of claim 9, wherein the at least one parameter field in the requested URL of each of the plurality of web requests is determined to match the known attack if the parameter value comprises at least one special character.

16. The non-transitory computer-readable storage medium of claim 15, wherein the at least one special character comprises at least one of a double quote;
  a single quote;
  an angle bracket;
  \n;
  \r;
  \0;
  invalid characters; and
  other special characters.

17. A system that detects vulnerabilities in a web application, comprising:
  a receiving mechanism configured to receive a plurality of web requests directed to the web application, wherein each web request specifies a request field including a requested uniform request locator (URL) having a hostname and at least one parameter field, the at least one parameter field including a parameter and a parameter value corresponding to the parameter;
  a determination mechanism, implemented using a hardware computing device, configured to determine an initial list of suspicious web requests of the plurality of web requests by determining if the at least one parameter field in the requested URL of each of the plurality of web requests matches a known attack,
  wherein the determination mechanism is configured to generate a final list of suspicious web requests by filtering the initial list of suspicious web requests, the filtering including removing duplicate suspicious web requests; and
  the determination mechanism is further configured to receive a set of predetermined attack strings configured to test a range of vulnerabilities of the web application, determine whether each of the suspicious web requests of the final list potentially exploits a vulnerability of the web application based on the set of predetermined attack strings by replaying each of the suspicious web requests of the final list using the predetermined attack strings and determining whether a script has been executed or a special character has been returned during the replay.

18. The system of claim 17, further comprising a storage mechanism configured to store a set of suspicious web requests, which have been verified as exploiting a vulnerability of the web application, to a database.

19. The system of claim 17, wherein the determination mechanism is configured to determine an initial of suspicious web requests of the plurality of web requests by using a regular expression to determine if the at least one parameter field in each requested URL matches the known attack.

20. The system of claim 19, wherein the determination mechanism is configured to:
  for each parameter field that matches a known attack of the web request,
    replace the parameter value of the respective parameter field with each of the set of predetermined attack strings;
    replay each of the suspicious web requests of the final list using the respective replaced set of predetermined attack strings; and
  determine whether each of the suspicious webs requests of the final list potentially exploits a vulnerability of the web application based on a result of the replay.

21. The method of claim 4, wherein the replacing the parameter value of the respective parameter field comprises replacing a part of the web request sent by a user.

22. The method of claim 1, wherein generating a final list of suspicious web requests comprises:
  filtering the initial list of suspicious web requests based at least on an attack skeleton analysis between the respective suspicious web requests of the initial list.

\* \* \* \* \*